US011073231B2

(12) United States Patent
Lai

(10) Patent No.: US 11,073,231 B2
(45) Date of Patent: Jul. 27, 2021

(54) TELESCOPIC TUBE ASSEMBLY

(71) Applicant: Hsin-Yuan Lai, Taichung (TW)

(72) Inventor: Hsin-Yuan Lai, Taichung (TW)

( * ) Notice: Subject to any disclaimer, the term of this patent is extended or adjusted under 35 U.S.C. 154(b) by 388 days.

(21) Appl. No.: 16/278,823

(22) Filed: Feb. 19, 2019

(65) Prior Publication Data

US 2019/0368637 A1    Dec. 5, 2019

(30) Foreign Application Priority Data

May 31, 2018 (TW) ................... 107207208

(51) Int. Cl.
*F16L 27/12* (2006.01)
*F16L 9/00* (2006.01)

(52) U.S. Cl.
CPC ............. *F16L 9/00* (2013.01); *F16L 27/12* (2013.01); *F16L 27/1274* (2019.08)

(58) Field of Classification Search
CPC ....... F16L 27/12; F16L 27/125; F16L 27/127; F16L 27/1273; F16L 27/1274
USPC .......................................... 285/7, 302, 298
See application file for complete search history.

(56) References Cited

U.S. PATENT DOCUMENTS

| 3,351,359 A | * | 11/1967 | Ferraris | A47L 9/244 285/7 |
| 3,351,363 A | * | 11/1967 | Downey | A47L 9/244 285/303 |
| 2017/0002850 A1 | | 1/2017 | Lai | |

FOREIGN PATENT DOCUMENTS

| JP | 2000249281 A | 9/2000 |
| JP | 2002531789 A | 9/2002 |
| JP | 2007321916 A | 12/2007 |

OTHER PUBLICATIONS

Office Action issued to Japanese counterpart application No. 2019-025403 by the Japan Patent Office dated Feb. 12, 2020.

* cited by examiner

*Primary Examiner* — Aaron M Dunwoody

(57) ABSTRACT

A telescopic tube assembly includes a telescopic tube sub-assembly having a first tube and a second tube, a tubular member, a sleeve member, at least one retaining member, an actuating sleeve, and a biasing member for biasing the actuating sleeve to a locked position. When the actuating sleeve is in the locked position, the retaining member is engaged in a cavity of the tubular member to guard against axial movement of the second tube relative to the first tube. When the actuating sleeve is moved to an unlocked position against a biasing force of the basing member, the retaining member is disengaged from the cavity to permit the axial movement of the second tube.

5 Claims, 8 Drawing Sheets

TELESCOPIC TUBE ASSEMBLY

CROSS-REFERENCE TO RELATED APPLICATION

This application claims priority from Taiwanese utility model patent application no. 107207208, filed on May 31, 2018.

FIELD

The disclosure relates to a telescopic tube assembly, more particularly to a telescopic tube assembly in which a second tube is axial movable relative to a first tube.

BACKGROUND

U.S. patent Ser. No. 10/030,681 B2 discloses a conventional telescopic tube assembly which includes a telescopic tube subassembly having first and second tubes, a tubular member configured to move with the second tube, an outer sleeve sleeved on the first tube, a retaining member, an actuating member, and a biasing member. When the second tube is in an extended position, the second tube extends out of the first tube, and the retaining member is engaged in a cavity of the tubular member so as to guard against axial movement of the second tube. When the second tube is in a retracted position, the second tube is received in the first tube, and the retaining member is retracted to be disengaged from the cavity so as to permit the axial movement of the second tube. The actuating member is axial movable relative to the outer sleeve to permit movement of the retaining member.

SUMMARY

Therefore, an object of the disclosure is to provide a novel telescopic tube assembly which is easy operable and which has a simplified configuration.

According to the disclosure, a telescopic tube assembly includes a telescopic tube subassembly, a tubular member, a sleeve member, at least one retaining member, an actuating sleeve, and a biasing member. The telescopic tube subassembly includes a first tube and a second tube which respectively have coupling ends telescopically fitted to each other along a longitudinal axis. The first tube has a first inner peripheral surface which defines a first axial bore. The second tube has a second inner peripheral surface which defines a second axial bore. The second tube is axially movable between an extended position, where the second tube extends out of the first axial bore, and a retracted position, where the second tube is received in the first axial bore. The tubular member extends along the longitudinal axis, and has an outer tubular surface which has an outer large-dimension region and an outer small-dimension region, and which define an outer shoulder between the outer large-dimension region and the outer small-dimension region. The outer large-dimension region is configured to be slidably engaged with the first inner peripheral surface. The outer small-dimension region is configured to be in frictional engagement with the second inner peripheral surface so as to permit the second tube to be abuttable against the outer shoulder. The tubular member further has a cavity formed in the outer large-dimension region in proximity to the coupling end of the second tube. The sleeve member includes an upper segment which is configured to be sleeved on and in frictional engagement with the coupling end of the first tube, and a lower segment which is configured to be slidably engaged with the second tube. The sleeve member has at least one passage extending radially through the lower segment. The retaining member is disposed in the passage, and has a retaining end and a follower end which are radially opposite to each other. The retaining member is movable radially between an inward position, where the second tube is in the extended position and the retaining end is fully engaged in the cavity so as to guard against axial movement of the second tube, and an outward position, where the retaining end is retracted in the passage to be disengaged from the cavity so as to permit the axial movement of the second tube. The actuating sleeve is sleeved on the lower segment of the sleeve member, and is disposed to be movable relative to the sleeve member so as to be displaceable among a locked position, where the retaining member is in the inward position, an unlocked position, where the retaining member is in the outward position, and a ready position, where the retaining member is permitted to be moved away from the inward position by an initiation of the axial movement of the second tube. The actuating sleeve has at least one cam surface configured to be confrontable with the follower end such that when the actuating sleeve is displaced toward the locked position from the unlocked position, the retaining member is pressed radially and inwardly due to the cam action between the cam surface and the follower end, so as to permit displacement of the retaining member to the inward position. The biasing member is disposed between the sleeve member and the actuating sleeve to bias the actuating sleeve to move toward the locked position. The actuating sleeve has an inner peripheral surface formed with at least one camming groove to provide the cam surface. The actuating sleeve is turnable about the longitudinal axis relative to the sleeve member such that when the actuating sleeve is in the locked position, the cam surface is angularly displaced from the follower end to prevent radial movement of the retaining member to the outward position from the inward position, and such that once the actuating sleeve is displaced to the ready position, the cam surface is brought to confront the follower end to permit the radial movement of the retaining member.

BRIEF DESCRIPTION OF THE DRAWINGS

Other features and advantages of the disclosure will become apparent in the following detailed description of the embodiment with reference to the accompanying drawings, in which.

DETAILED DESCRIPTION

Figure 1:
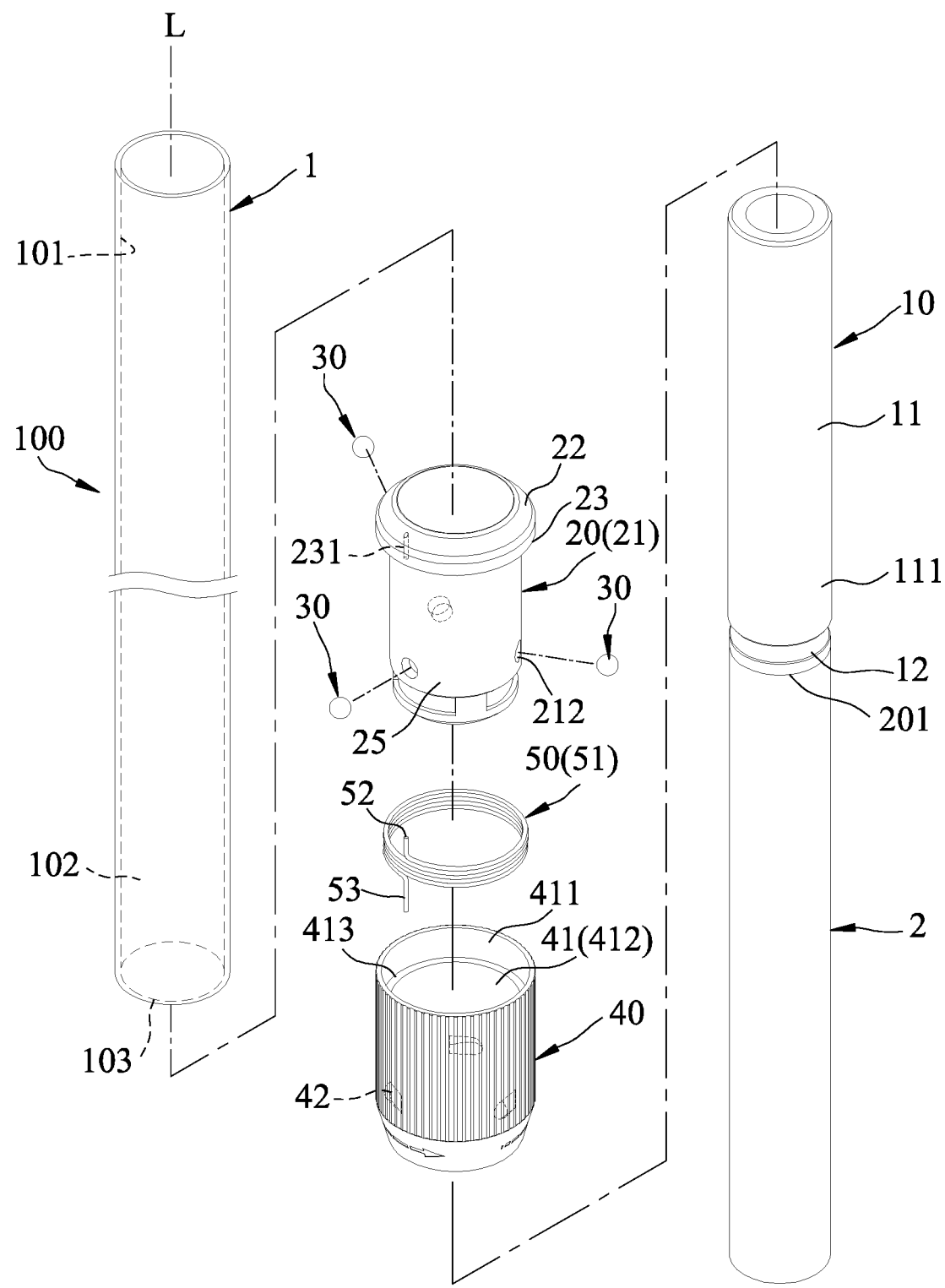
FIG. 1 is an exploded perspective view of a telescopic tube assembly according to an embodiment of the disclosure.
Figure 2:
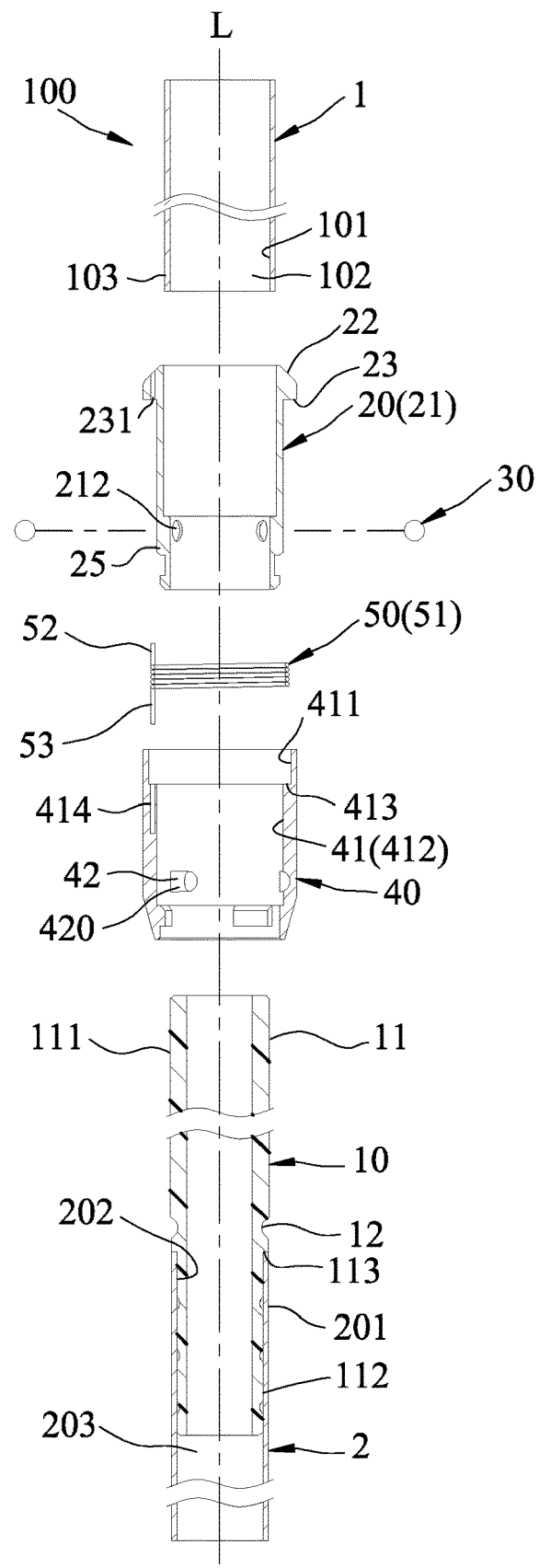
FIG. 2 is an exploded cross-sectional view of the telescopic tube assembly.
Figure 3:
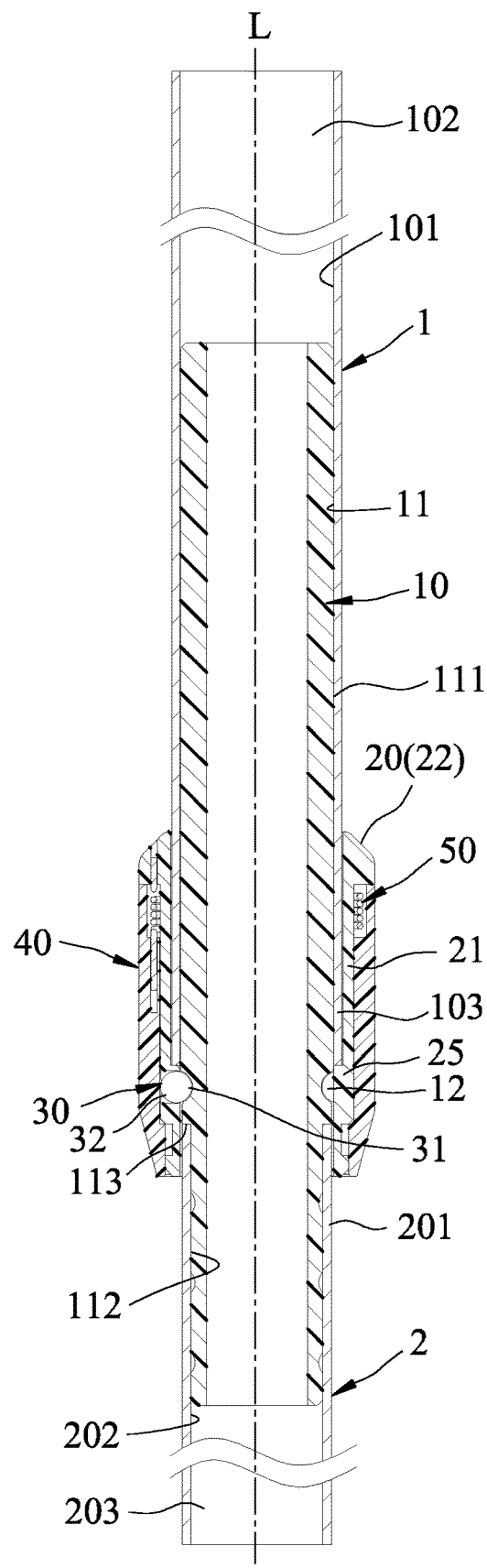
FIG. 3 is a cross-sectional view of the telescopic tube assembly.

Referring to FIGS. 1 to 3, a telescopic tube assembly according to an embodiment of the disclosure is shown to include a telescopic tube subassembly 100, a tubular member 10, a sleeve member 20, at least one retaining member 30, an actuating sleeve 40, and a biasing member 50.

Figure 4:
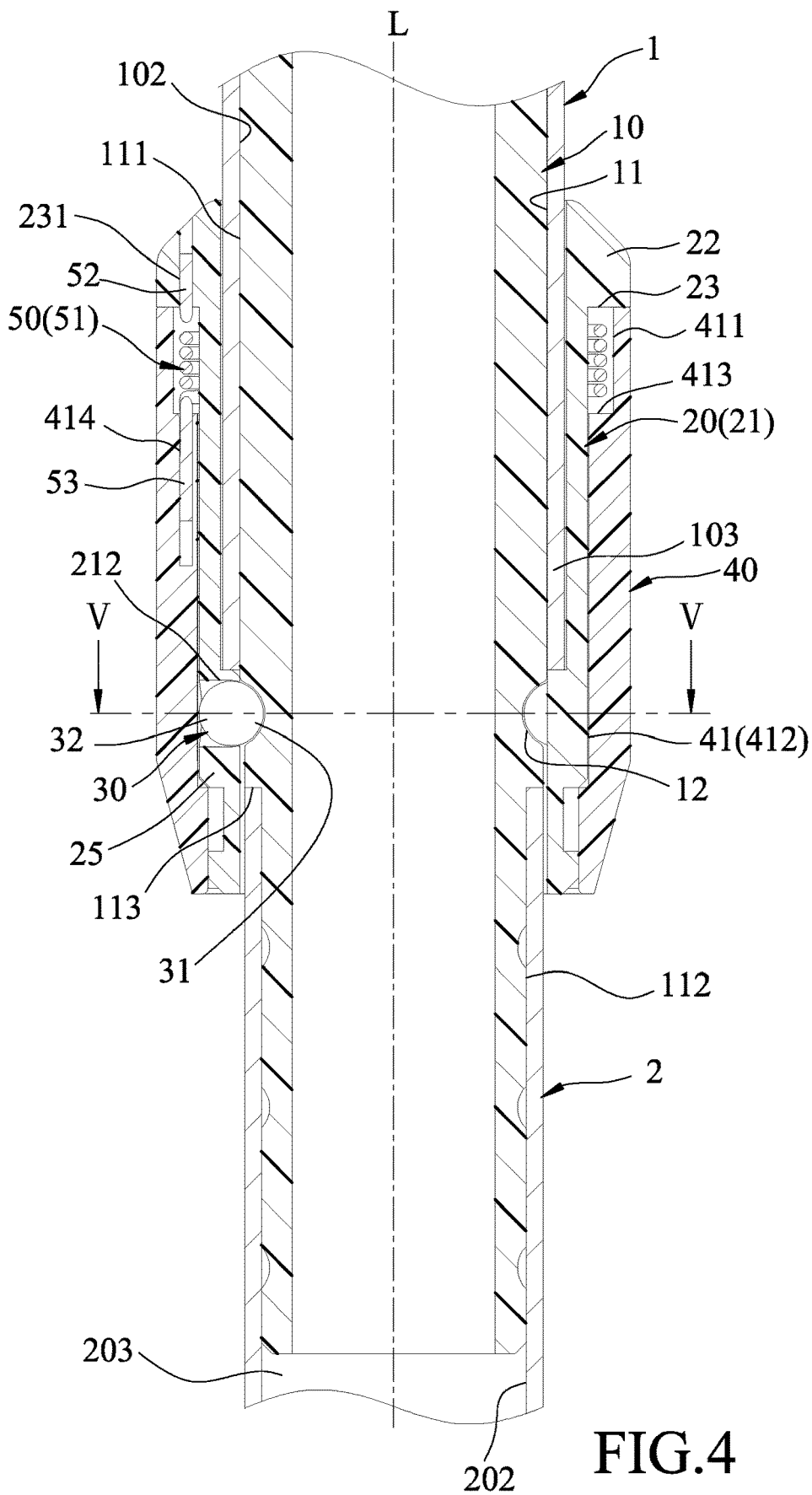
FIG. 4 is a fragmentary enlarged view of the telescopic tube assembly illustrating a retaining member in an inward position and an actuating sleeve in a locked position.
Figure 6:
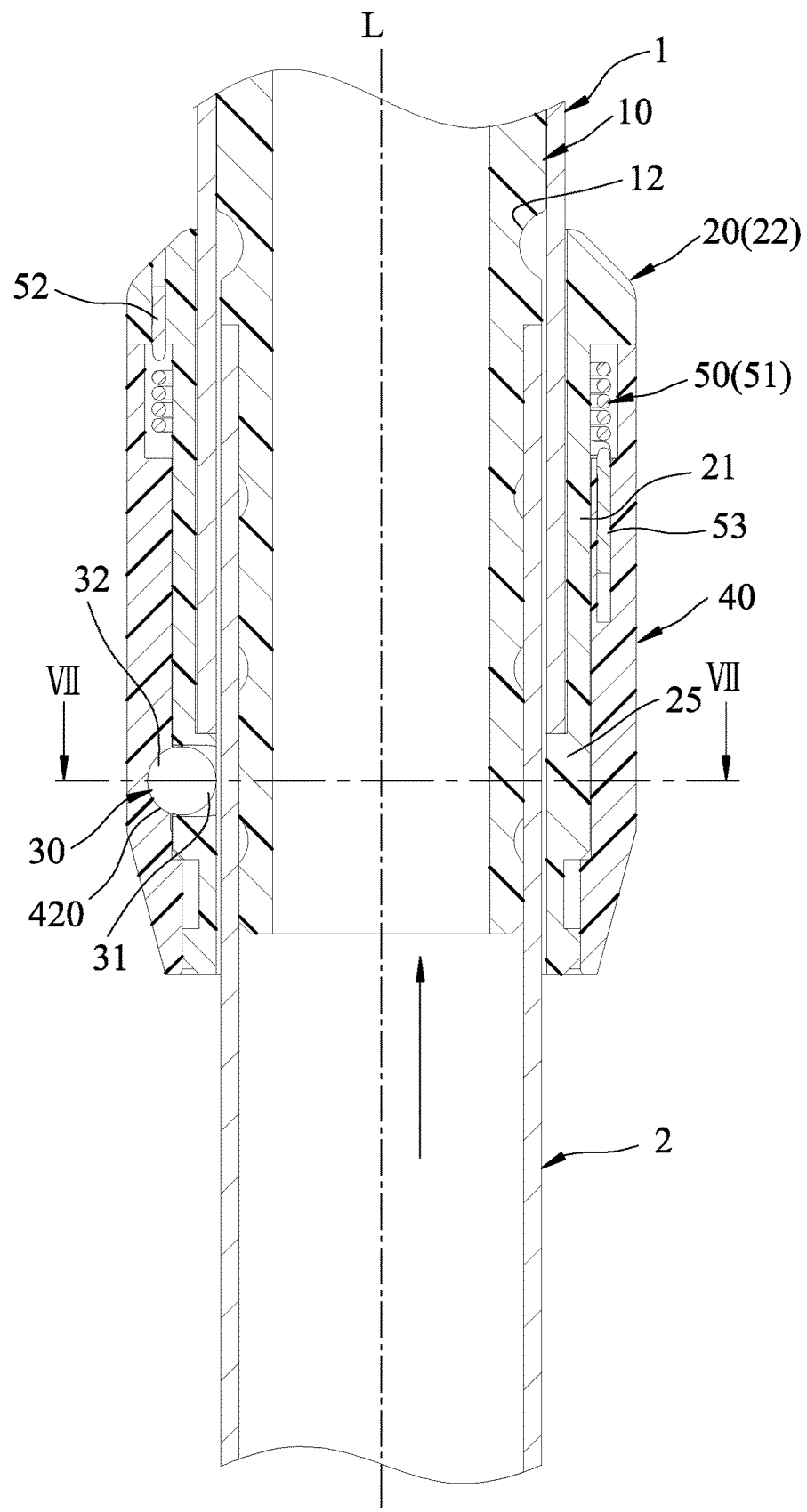
FIG. 6 is similar to FIG. 4 but illustrating the retaining member in an outward position and the actuating sleeve in an unlocked position.

The telescopic tube subassembly 100 includes a first tube 1 and a second tube 2 which respectively have coupling ends 103, 201 telescopically fitted to each other along a longitudinal axis (L). The first tube 1 has a first inner peripheral surface 101 which defines a first axial bore 102. The second tube 2 has a second inner peripheral surface 202 which defines a second axial bore 203. The second tube 2 is axially movable between an extended position and a retracted position. In the extended position, as shown in FIGS. 3 and 4, the second tube 2 extends out of the first axial bore 102. In the retracted position, as shown in FIG. 6, the second tube 2 is received in the first axial bore 102.

The tubular member 10 extends along the longitudinal axis (L), and has an outer tubular surface 11 which has an outer large-dimension region 111 and an outer small-dimension region 112, and which define an outer shoulder 113 between the outer large-dimension region 111 and the outer small-dimension region 112. The outer large-dimension region 111 is configured to be slidably engaged with the first inner peripheral surface 101 to permit the tubular member 10 to be slidable relative to the first inner peripheral surface 101 along the longitudinal axis (L). The outer small-dimension region 112 is configured to be in frictional engagement with the second inner peripheral surface 202 so as to permit the second tube 2 to be abuttable against the outer shoulder 113 and to permit the tubular member 10 to move with the second tube 2. The tubular member 10 further has a cavity 12 formed in the outer large-dimension region 111 in proximity to the coupling end 201 of the second tube 2.

Figure 5:
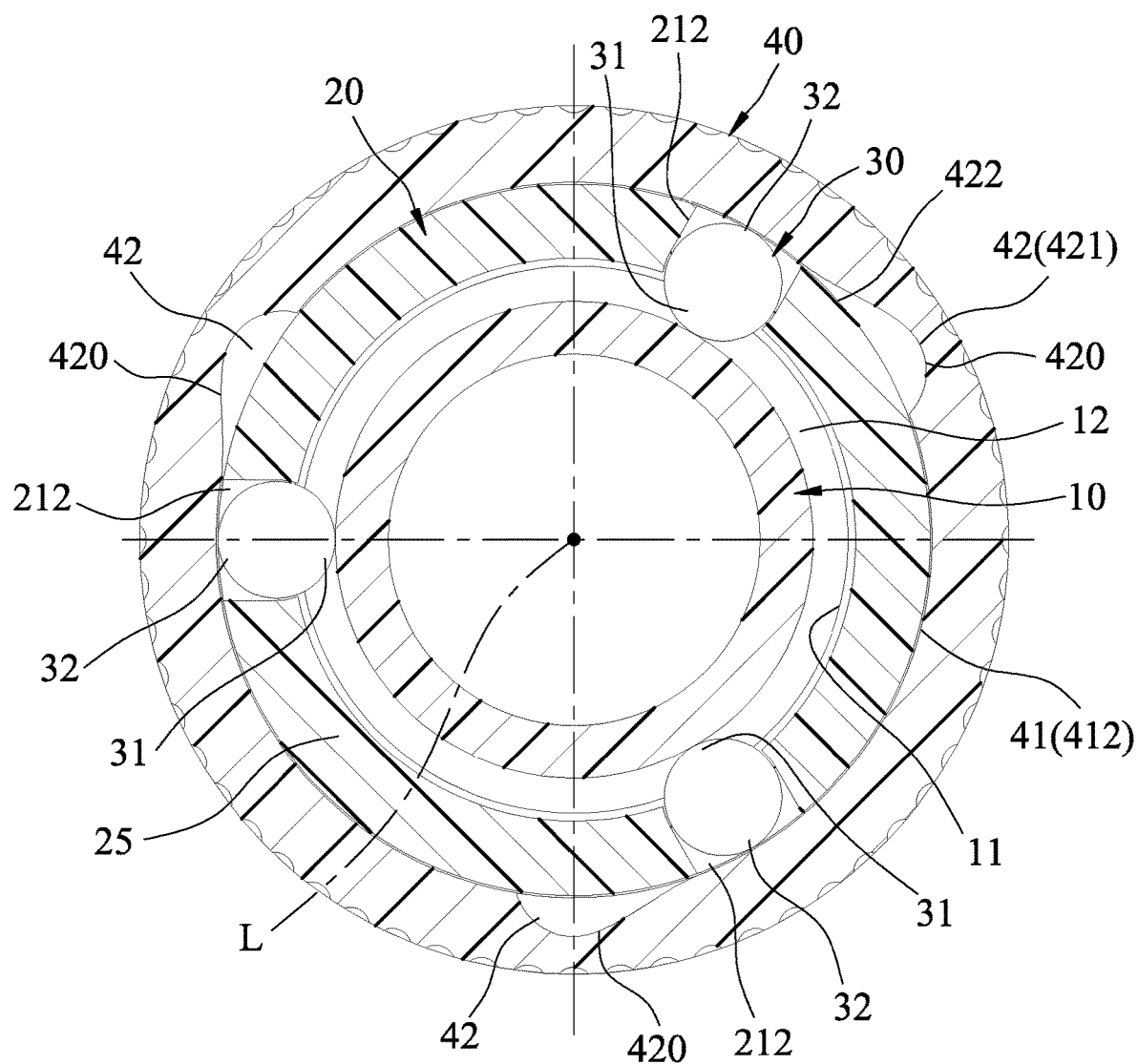
FIG. 5 is a cross-sectional view taken along line V-V of FIG. 4.

In an embodiment shown in FIGS. 1, 4 and 5, the cavity 12 extends in a circumferential direction surrounding the longitudinal axis (L).

The sleeve member 20 includes an upper segment 21 and a lower segment 25. The upper segment 21 is configured to be sleeved on and in frictional engagement with the coupling end 103 of the first tube 1. The lower segment 25 is configured to be slidably engaged with the second tube 2. The sleeve member 20 has at least one passage 212 extending radially through the lower segment 25.

Figure 7:
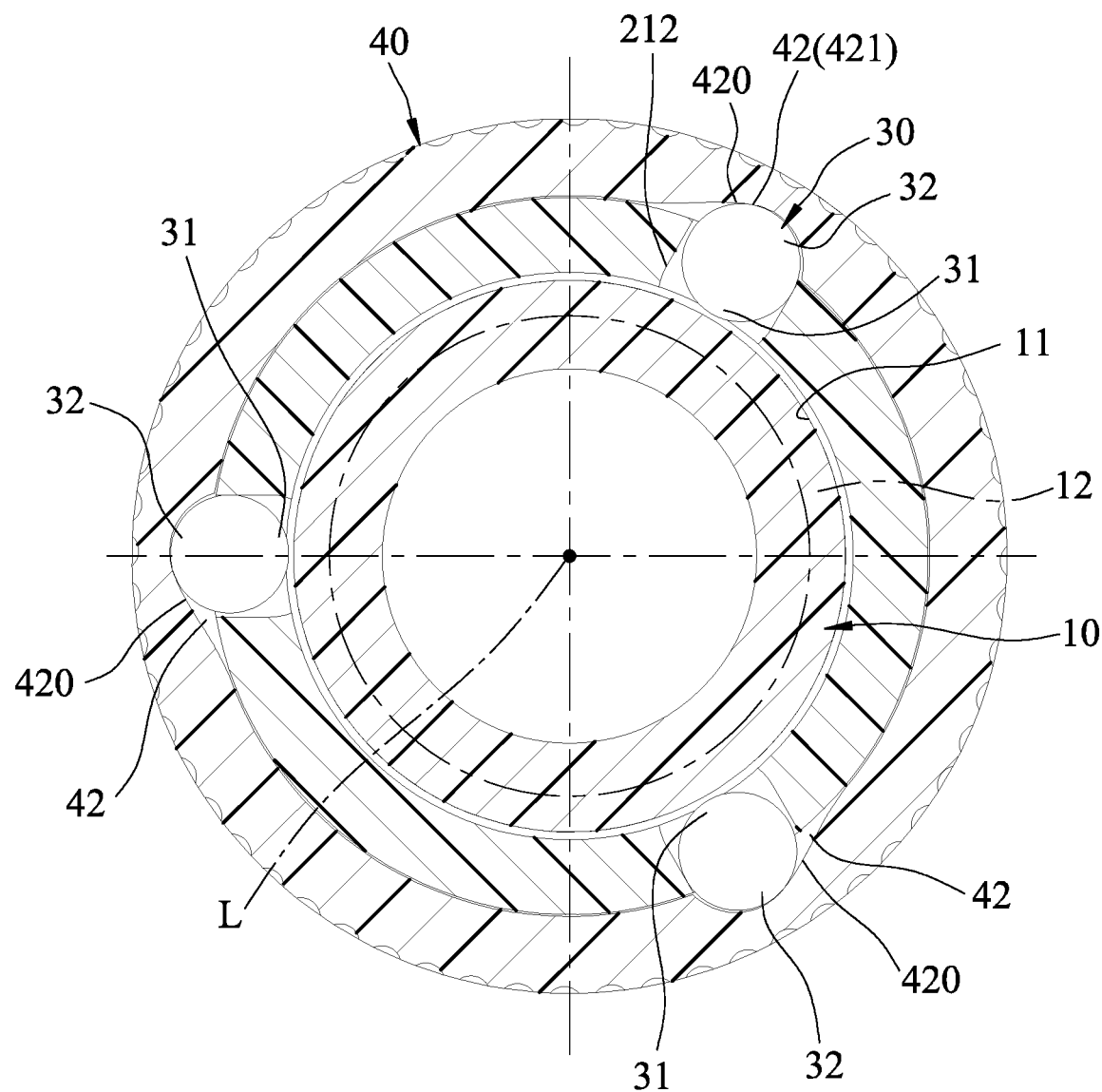
FIG. 7 is a cross-sectional view taken along line VII-VII of FIG. 6.

The retaining member 30 is disposed in the passage 212, and has a retaining end 31 and a follower end 32 which are radially opposite to each other. The retaining member 30 is movable radially between an inward position and an outward position. In the inward position, as shown in FIGS. 3 to 5, the second tube 2 is in the extended position and the retaining end 31 is fully engaged in the cavity 12 so as to guard against axial movement of the second tube 2. In the outward position, as shown in FIGS. 6 to 7, the retaining end 31 is retracted in the passage 212 to be disengaged from the cavity 12 so as to permit the axial movement of the second tube 12. In an embodiment shown in FIGS. 1, 4, and 5, the retaining member 30 is in the form of a rolling ball.

Figure 8:
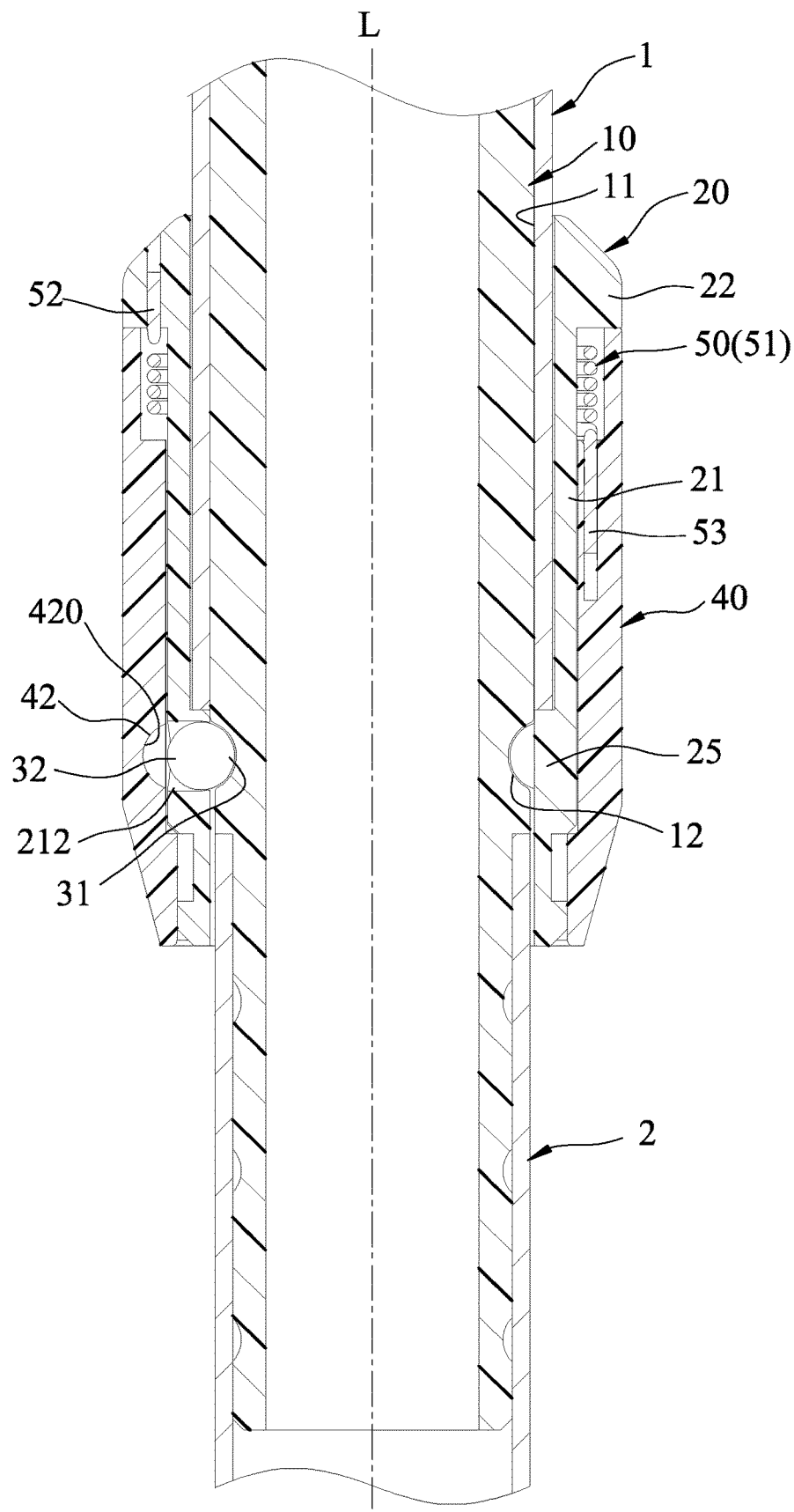
FIG. 8 is similar to FIG. 4 but illustrating the actuating sleeve in a ready position.

The actuating sleeve 40 is sleeved on the lower segment 25 of the sleeve member 20, and is disposed to be movable relative to the sleeve member 20 so as to be displaceable among a locked position, an unlocked position, and a ready position. In the locked position, as shown in FIGS. 3 to 5, the retaining member 30 is in the inward position. In the unlocked position, as shown in FIGS. 6 to 7, the retaining member 30 is in the outward position. In the ready position, as shown in FIG. 8, the retaining member 30 is permitted to be moved away from the inward position by an initiation of the axial movement of the second tube 2. The actuating sleeve 40 has at least one cam surface 420 configured to be confrontable with the follower end 32 such that when the actuating sleeve 40 is displaced toward the locked position from the unlocked position, the retaining member 30 is pressed radially and inwardly due to the cam action between the cam surface 420 and the follower end 32, so as to permit displacement of the retaining member 30 to the inward position.

As shown in FIGS. 4 and 5, the actuating sleeve 40 has an inner peripheral surface 41 formed with at least one camming groove 42 to provide the cam surface 420. The actuating sleeve 40 is turnable about the longitudinal axis (L) relative to the sleeve member 20. When the actuating sleeve 40 is in the locked position (FIG. 5), the cam surface 420 is angularly displaced from the follower end 32 to prevent radial movement of the retaining member 30 to the outward position (FIG. 7) from the inward position (FIG. 5). Once the actuating sleeve 40 in FIG. 5 is turned in a counterclockwise direction to be displaced to the ready position (FIG. 8), the cam surface 420 is brought to confront the follower end 32 to permit the radial movement of the retaining member 30, thereby allowing the axial movement of the second tube 2 from the extended position (FIG. 5) toward the retracted position (FIG. 6). Meanwhile, the biasing member 50 acquires a biasing force.

Once the second tube 2 is displaced back to the extended position to permit the passage 212 to be in radial alignment with the cavity 12, the actuating sleeve 40 is biased to the locked position by the biasing force so as to move the retaining member 30 back to the inward position by virtue of the cam action.

In operation, by turning the actuating sleeve 40 to the ready position, the second tube 2 is permitted to be manually moved relative to the first tube 1. Once the second tube 2 is manually moved back to the extended position, and the actuating sleeve 40 is permitted to be biased to the locked position so as to keep the second tube 2 in the extended position. Therefore, the telescopic tube assembly of this disclosure is easy to operate, and has a simplified configuration compared to the conventional telescopic tube assembly disclosed in U.S. patent Ser. No. 10/030,681 B2.

In an embodiment shown in FIG. 5, the camming groove 42 has a deep region 421 and a shallow region 422 which are respectively distal from and proximate to the retaining member 30 when the actuating sleeve 40 is in the locked position.

The biasing member 50 is disposed between the sleeve member 20 and the actuating sleeve 40 to bias the actuating sleeve 40 to move toward the locked position.

In an embodiment shown in FIG. 5, the lower segment 25 has a plurality of the passages 212 which are angularly displaced from each other about the longitudinal axis (L). The inner peripheral surface 41 of the actuating sleeve 40 is formed with a plurality of the camming grooves 42 which are angularly displaced from each other about the longitudinal axis (L). The telescopic tube assembly further includes a plurality of the retaining members 30 disposed respectively in the passages 212. In FIG. 3, three passages 212, three retaining members 30, and three camming grooves 42 are provided. Other numbers of passages and corresponding retaining members and camming grooves may be provided.

In an embodiment shown in FIG. 4, the inner peripheral surface 41 of the actuating sleeve 40 includes an upper surface region 411, and a lower surface region 412 which has a dimension smaller than that of the upper surface region 411 to form an upward shoulder 413. The upper segment 21 of the sleeve member 20 has an upper flange 22 with a downward shoulder 23 confronting the upward shoulder 413. The biasing member 50 is a torsion spring having a spring body 51 which is sleeved on the sleeve member 20, and two spring ends 52, 53 which are respectively secured to the upward and downward shoulders 413, 23.

In an embodiment shown in FIG. 4, each of the upward and downward shoulders 413, 23 is formed with an insert hole 414, 231 configured to permit insertion of a respective one of the spring ends 52, 53.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A telescopic tube assembly, comprising:
a telescopic tube subassembly including a first tube and a second tube which respectively have coupling ends telescopically fitted to each other along a longitudinal axis, said first tube having a first inner peripheral surface which defines a first axial bore, said second tube having a second inner peripheral surface which defines a second axial bore, said second tube being axially movable between an extended position, where said second tube extends out of said first axial bore, and a retracted position, where said second tube is received in said first axial bore;
a tubular member extending along the longitudinal axis, and having an outer tubular surface which has an outer large-dimension region and an outer small-dimension region, and which define an outer shoulder between said outer large-dimension region and said outer small-dimension region, said outer large-dimension region being configured to be slidably engaged with said first inner peripheral surface, said outer small-dimension region being configured to be in frictional engagement with said second inner peripheral surface so as to permit said second tube to be abuttable against said outer shoulder, said tubular member further having a cavity formed in said outer large-dimension region in proximity to said coupling end of said second tube;
a sleeve member including an upper segment which is configured to be sleeved on and in frictional engagement with said coupling end of said first tube, and a lower segment which is configured to be slidably engaged with said second tube, said sleeve member having at least one passage extending radially through said lower segment;
at least one retaining member disposed in said passage, and having a retaining end and a follower end which are radially opposite to each other, said retaining member being movable radially between an inward position, where said second tube is in the extended position and said retaining end is fully engaged in said cavity so as to guard against axial movement of said second tube, and an outward position, where said retaining end is retracted in said passage to be disengaged from said cavity so as to permit the axial movement of said second tube;
an actuating sleeve sleeved on said lower segment of said sleeve member, and disposed to be movable relative to said sleeve member so as to be displaceable among a locked position, where said retaining member is in the inward position, an unlocked position, where said retaining member is in the outward position, and a ready position, where said retaining member is permitted to be moved away from the inward position by an initiation of the axial movement of said second tube, said actuating sleeve having at least one cam surface configured to be confrontable with said follower end such that when said actuating sleeve is displaced toward the locked position from the unlocked position, said retaining member is pressed radially and inwardly due to the cam action between said cam surface and said follower end, so as to permit displacement of said retaining member to the inward position; and
a biasing member disposed between said sleeve member and said actuating sleeve to bias said actuating sleeve to move toward the locked position, characterized in that
said actuating sleeve has an inner peripheral surface formed with at least one camming groove to provide said cam surface, said actuating sleeve being turnable about the longitudinal axis relative to said sleeve member such that when said actuating sleeve is in the locked position, said cam surface is angularly displaced from said follower end to prevent radial movement of said retaining member to the outward position from the inward position, and such that once said actuating sleeve is displaced to the ready position, said cam surface is brought to confront said follower end to permit the radial movement of said retaining member.

2. The telescopic tube assembly according to claim 1, wherein said cavity extends in a circumferential direction surrounding the longitudinal axis.

3. The telescopic tube assembly according to claim 1, wherein
said lower segment has a plurality of said passages which are angularly displaced from each other about the longitudinal axis,
said inner peripheral surface of said actuating sleeve is formed with a plurality of said caroming grooves which are angularly displaced from each other about the longitudinal axis, and said telescopic tube assembly comprises a plurality of said retaining members disposed respectively in said passages.

4. The telescopic tube assembly according to claim 1, wherein said inner peripheral surface of said actuating sleeve includes an upper surface region, and a lower surface region which has a dimension smaller than that of said upper surface region to form an upward shoulder, said upper segment of said sleeve member has an upper flange with a downward shoulder confronting said upward shoulder, and said biasing member is a torsion spring having a spring body which is sleeved on said sleeve member, and two spring ends which are respectively secured to said upward and downward shoulders.

5. The telescopic tube assembly according to claim 4, wherein each of said upward and downward shoulders is formed with an insert hole configured to permit insertion of a respective one of said spring ends.

* * * * *